UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

COMPOSITE TITANIC-OXID PIGMENT AND METHOD OF PRODUCING THE SAME.

14,289. Specification of Reissued Letters Patent. Reissued Apr. 24, 1917.

No Drawing. Original No. 1,155,462, dated October 5, 1915, Serial No. 850,876, filed July 14, 1914. Application for reissue filed August 3, 1916. Serial No. 113,023.

*To all whom it may concern:*

Be it known that I, LOUIS E. BARTON, a citizen of the United States, and a resident of Niagara Falls, in the county of Niagara and State of New York, have invented a certain new and useful Composite Titanic-Oxid Pigment and Method of Producing the Same, of which the following is a specification.

My present invention relates to substances, employed as pigments in paint, and particularly to those containing important percentages of titanic oxid. Its objects comprise provision of methods whereby, on industrial scales, with economy and relatively slight technical skill or care, such pigments are producible, substantially white in color and in which a given proportion of titanic oxid will produce its characteristic beneficial effects in a greater and more perfect degree than hitherto, particularly as regards the hiding power of the pigment when mixed as usual with oil and spread as paint. The increased hiding power thus imparted to oil paint by my novel composite titanic oxid pigments seems attributable only to my novel methods of producing them, which result in an extremely, if not unprecedentedly, minute subdivision of the titanic constituent and its peculiar attachment to, or coalescence with, suspended minute particles of a sulfate base, or "extender", usually preponderating, but which has, however, by itself, in oil, no hiding power; and I am satisfied that equally good results are unattainable through any mere mechanical mixing of the same or even greater proportions of any titanic material with similar bases otherwise produced.

It is known that soluble salts of the alkali-earths react with solutions of sulfates to form precipitates of insoluble sulfate; and it is also known that acid solutions of titanic acid when much diluted and boiled precipitate titanic acid; but I have discovered that if to a comparatively concentrated solution of titanic sulfate, a soluble salt (such as calcium chlorid, or barium chlorid,) capable of forming by reaction with sulfuric acid an insoluble sulfate, be added, and the precipitated sulfate be allowed to remain in suspension while the charge is digested (not boiled); the precipitation of titanic acid is accelerated and the yield greatly increased notwithstanding the high concentration of the solution; and furthermore the titanic oxid under these conditions is precipitated in an extremely fine state of division and seems to attach itself to the suspended particles of sulfate base in a manner analogous to that in which organic coloring matter, precipitated from solution, attaches to suspended particles, in the preparation of lake-pigments for example. The product resulting from my said discovery appears to be in the nature of an "adsorption-compound", or a coalescence of colloidal titanic acid and sulfate particles.

My methods are practised and my novel composite products attained as follows:—I first obtain, in any convenient manner, a titanic sulfate solution, as free from impurities as possible. I can use any titaniferous material which can be brought into sulfuric acid solution, as, for example, titaniferous iron ore, or ilmenite, dissolved in sulfuric acid, or first fused with alkali compounds and subsequently dissolved in sulfuric acid, but I prefer to use, on account of their comparative freedom from objectionable impurities, such as iron oxid, and also because they are so easily dissolved by sulfuric acid, the dried, uncalcined, products resulting from either of the procedures jointly invented by Auguste J. Rossi and myself, for which have been granted to us Letters Patent No. 1,106,409 and No. 1,106,410, both dated August 11, 1914, and for which is still pending our application Serial No. 840,197, filed May 22, 1914.

By our said procedures the desired solution is, generally speaking, obtained by aid of melting titanic oxid together with sulfid of an alkali metal, or with sulfate of an alkali metal and carbon, lixiviating, or not, the resulting melts and boiling them in dilute sulfuric acid:—the resulting dried products consist preponderatingly of titanic oxid in the form of soft, gray, powder, their constituents being, as shown by analyses, variable within the following limits, viz:

| | |
|---|---|
| Titanic oxid | 65 to 80% |
| Silica | 1 to 5 |
| Iron oxid | 1 to 7 |
| Soda | 2 to 15 |
| Sulfur (free) | 1 to 15 |
| Sulfuric anhydrid | $\frac{1}{10}$ to 1 |

Preferably such a titaniferous material, or titanic oxid concentrate, I digest at a temperature of 100° C. to 150° C. in an iron, or other refractory, vessel with 95% sulfuric acid in the proportion of 2.5 to 2.6 parts, by weight, of sulfuric acid to one part by weight of the titanic oxid. I continue the digestion until a sample taken from the digester shows by analysis a practically complete combination of the sulfuric acid with the bases. Under these conditions 85% to 95% of the titanic oxid of the charge will be combined with sulfuric acid as titanic sulfate. This mass of materials I then remove from the digester to a lead-lined, or other, refractory vessel and therein dissolve them in water, the volume of which is about three times that of the sulfuric acid used in the charge. The resulting solution is of suitable concentration for filtration from any undissolved residue and of convenient volume for storage. To say 140 parts, by weight, of this titanic sulfate solution having a specific gravity of about 1.40 and containing approximately 15% titanic oxid, I add a solution, preferably hot, of about 40 parts of calcium chlorid, the exact chemically equivalent quantity of calcium chlorid being calculated from the total sulfuric acid as determined by analysis of the titanic sulfate solution—and the volume of the mixed solutions made up by additions of water to three times that of the titanic sulfate solution used. This mixed solution containing, immediately precipitated, suspended, calcium sulfate I then treat in any convenient manner so as to promote precipitation therein of titanic acid, as, for example, by digesting it at about 100° C. for five to eight hours in a closed vessel, preferably connected with a reflux condenser by which any small quantity of acid vapor is returned to the digester. The completion of the digesting operation can be determined by withdrawing a sample of the charge and determining approximately the percentage of titanic oxid remaining in solution. I next filter out the composite precipitated product, wash it with cold water, dry it and calcine it at a red heat until free from volatile matter (*i. e.*, combined water).

The result of all the operations, including calcination, may be indicated by the following equation, viz:—

$$Ti(SO_4)_2+2CaCl_2+2H_2O=\overset{\text{Pigment product.}}{TiO_2}+2CaSO_4+4HCl$$

From this equation the theoretical composition of the product is:

| | |
|---|---|
| Titanic oxid ($TiO_2$) | 23.42% |
| Calcium sulfate ($CaSO_4$) | 76.58% |

But the chemical composition may be influenced by the presence in the original sulfate solution of impurities such as sulfates other than titanic sulfate, and by the incompleteness of precipitation of either titanic acid, or calcium sulfate, or both; and I have found by many operations, as last described, that the composition will, in practice, vary about as follows:—

| | |
|---|---|
| Titanic oxid | 15 to 25% |
| Calcium sulfate | 75 to 85% |

and that the specific gravity varies from 2.95 to 3.10 depending on composition.

It will be noted that as a result of calcination the calcium sulfate constituent of the product is the anhydrous form and not the hydrated variety hitherto used in pigments as an "extender."

A complete analysis of one lot of my product showed the composition

| | |
|---|---|
| Titanic oxid | 23.92% |
| Calcium sulfate | 75.57 |
| Iron oxid | .18 |
| Soda | .12 |
| Chlorin | Trace. |
| Loss upon ignition | .08 |
| Specific gravity | 3.07 |

As to my resulting final composite titanic oxid products the following characteristics are notable, viz: Their titanic oxid constituents are white, amorphous, or non-crystalline, and, I believe, chemically uncombined with other substances. Their calcium sulfate constituents are anhydrous and in the form of exceedingly minute crystals, their dehydration being attributable to their calcination, and their exceptional minuteness likewise attributable to calcination and also, I believe, to the colloidal character of the solution and precipitation therein occurring. To these very minute calcium sulfate particles are externally adherent the said amorphous titanic oxid, thus imparting to them and so also to my composite pigments, as a whole, their hiding power and other desirable qualities.

Some of the foregoing characteristics of my pigments are discernible by aid of the microscope; also by examination under polarized light; in the latter case the larger, *i. e.*, sulfate, particles, appearing luminous and characteristically coated with the smaller particles of relatively opaque titanic oxid.

My composite titanic oxid pigment is therefore, when produced by aid of calcium chlorid, as aforesaid, characterizable and distinguishable as comprising titanic oxid and a sulfate, usually in the proportion of from 15% to 25% of the former to 75% to 85% of the latter; and as containing also, usually, iron oxid, say from traces to .25%; as of specific gravity say from 2.95 to 3.10; and as being, after calcination, a soft, very fine powder, in color white faintly tinged with cream; as containing sulfate particles in minute crystalline form and amorphous titanic oxid particles in still more minute form coalesced with, or more or less coating, said sulfate particles, *i. e.*, adhering to the latter externally.

The exceptional merits of my composite titanic pigments will be appreciated from the fact that notwithstanding they contain such comparatively low percentages of titanic oxid possessing hiding power, and such much greater percentages of a sulfate which of itself has no hiding power, their hiding power when mixed with oil for paint is fully equal to that of pigments containing 100% of the previously employed lead or zinc compounds.

I can hasten the operation, in some cases, if desired, by stirring, or agitating, occasionally the solution thus hastening the reactions. I can also, if in some cases thought advisable to increase the yield of product from a given charge, accomplish this by the following variations in the process heretofore described, viz: To my above described titanic sulfate solution of 1.40 specific gravity, containing about 15% titanic oxid and variable small percentages of iron and sodium sulfates with little, or no, free sulfuric acid, I add a saturated solution of the chlorid, as of calcium, both solutions being preferably, though not necessarily, hot when thus mixed. In treating this mixed solution, to promote precipitation of titanic acid, I, instead of digesting, evaporate, or distil, it, at about 100° C., with the result that the titanic acid is, by these equivalent means, precipitated, as before, on the precipitated calcium sulfate. Any escaping hydrochloric acid may, if desired, be condensed and recovered as a by-product. I conduct the said evaporation, or distillation, like the before described digestion, at a temperature of about 100° C. because I find that at this comparatively low temperature the iron chlorid which, if any, may separate meanwhile, is not decomposed but remains in crystalline form readily soluble in water. I prefer to conduct the distillation in a vacuum still because this permits rapid operation at comparatively low temperatures, and it will, of course, be understood that this, as well as all apparatus involving manipulation of the acid solutions, must be refractory to hydrochloric acid, *i. e.*, stoneware for example.

The residue in the still I take up with from eight to ten times its weight of hot water and digest it for a short time sufficient to completely dissolve ferric salts. I then filter, wash the precipitate thoroughly with water, and dry it and calcine it at a red heat as before described.

Though the yield of product from a given charge is in some cases considerably increased by these variations of my process, I regard it as possible that this advantage may be more frequently offset by the comparative complexity and expenses of operation and apparatus involved, but inasmuch as, for some purposes, its said variations may enhance its utility, I have described them here in order that there may be a complete understanding of all the ways, now known to me, in which my invention can be used. In this connection it is proper to add that I have also discovered that the titanic oxid content of my final product can, if so desired for certain purposes, be somewhat increased by a preliminary filtering of the mixed solution made after the addition of a part of the chlorid, the remainder of the chlorid being added to the filtrate. This is due to the fact that most of the resulting insoluble calcium sulfate precipitates in advance of the precipitation of the titanic acid, hence such preliminary filtration serves to separate from the solution a portion of the sulfate before titanic acid is thereon precipitated and thus correspondingly decreases the percentage of sulfate and increases the percentage of titanic oxid in the final calcined product, otherwise the operations are conducted as before described. My researches have also demonstrated that chlorid of barium is particularly well adapted as a substitute for chlorid of calcium in the operation of my method, and with similar, if not equal, results, but this I reserve for another application for patent.

Having now described my invention, what I claim as new and desire to secure by Letters Patent is the following, viz:

1. The method of treating a titanic sulfate solution which comprises adding thereto a compound capable of forming by reaction with said solution an insoluble sulfate and digesting the mass so as to produce a composite precipitate comprising such insoluble sulfate and titanic acid.

2. The method of treating a titanic sulfate solution which comprises adding thereto a soluble salt capable of forming by reaction with said solution an insoluble sulfate and digesting the mass so as to produce a composite precipitate comprising such insoluble sulfate and titanic acid.

3. The method of treating a titanic sulfate solution which comprises adding thereto a chlorid of an alkali earth metal and digesting the mass so as to produce a composite precipitate comprising an insoluble sulfate and titanic acid.

4. The method of treating a titanic sulfate solution which comprises adding thereto chlorid of calcium and digesting the mass so as to produce a composite precipitate comprising an insoluble sulfate and titanic acid.

5. The method of making pigments containing titanic oxid which comprises digesting a titanic compound in sulfuric acid until titanic sulfate is formed, adding a compound capable of forming an insoluble sulfate, treating the mixture to promote precipitation of titanic acid, separating the resulting precipitates, and calcining them.

6. The method of making pigments containing titanic oxid which comprises digesting a titanic compound in sulfuric acid until titanic sulfate is formed, adding chlorid of calcium, treating the mixture to promote precipitation of titanic acid, separating the resulting precipitates from the solution, and calcining them.

7. In the production of pigments containing titanic material the steps which consist in adding to a titanic sulfate solution a saturated solution of a compound capable of forming by reaction with said solution an insoluble sulfate and digesting the mass so as to produce a composite precipitate.

8. In the production of pigments containing titanic material the steps which consist in adding to a titanic sulfate solution a saturated solution of chlorid of calcium and digesting the mass so as to produce a composite precipitate.

9. In the production of pigments containing titanic oxid the steps which consist in adding to a titanic sulfate solution a solution of a soluble salt capable of forming by reaction with said solution an insoluble sulfate and digesting the mixture at about 100° C. until an insoluble sulfate and titanic acid have been precipitated.

10. In the production of pigments containing titanic oxid the steps which consist in adding to a titanic sulfate solution a solution of chlorid of calcium, and digesting the mixture at about 100° C. until insoluble sulfate of calcium and titanic acid have been precipitated.

11. In the production of pigments containing titanic oxid the steps which consist in adding to a titanic sulfate solution a saturated solution of a soluble salt capable of forming by reaction with said solution an insoluble sulfate, distilling or evaporating the resulting mixture at about 100° C., digesting the residue in hot water, separating the resulting precipitates from the solution and calcining them.

12. In the production of pigments containing titanic oxid the steps which consist in adding to a titanic sulfate solution a solution of chlorid of calcium, distilling or evaporating the resulting mixture at about 100° C., digesting the residue in hot water, separating the resulting precipitates from the solution and calcining them.

13. In the production of pigments containing titanic oxid the steps which consist in adding to a titanic sulfate solution a precipitant-compound capable of forming by reaction with said solution an insoluble sulfate, filtering the resulting solution to separate therefrom then-precipitated particles of said insoluble sulfate, adding more of said precipitant-compound to the filtrate, and separating therefrom precipitated particles of said insoluble sulfate and of titanic acid.

14. In the production of pigments containing titanic oxid the steps which consist in adding to a titanic sulfate solution chlorid of calcium, filtering the resulting solution to separate therefrom then-precipitated particles of calcium sulfate, adding more chlorid of calcium to the filtrate and separating therefrom precipitated particles of calcium sulfate and of titanic acid.

15. As a new article a composite pigment comprising titanic oxid and a sulfate extender.

16. As a new article a composite pigment comprising titanic oxid and more of a sulfate extender.

17. As a new article a composite pigment comprising a sulfate extender and, thereto adhering, titanic oxid.

18. As a new article a composite pigment comprising particles of a sulfate extender and thereto adhering smaller particles of titanic oxid.

19. As a new article a composite pigment comprising titanic oxid, a sulfate extender, and iron oxid.

20. As a new article a composite pigment comprising particles of a sulfate extender, thereto adhering smaller particles of titanic oxid, and comprising also iron oxid in quantity less than said titanic oxid.

21. As a new article a composite pigment comprising titanic oxid and calcium sulfate.

22. As a new article a composite pigment comprising titanic oxid and more calcium sulfate.

23. As a new article a composite pigment comprising calcium sulfate and thereto adhering titanic oxid.

24. As a new article a composite pigment comprising particles of calcium sulfate and thereto adhering smaller particles of titanic oxid.

25. As a new article a composite pigment comprising titanic oxid, calcium sulfate in quantity greater, and iron oxid in quantity less, than said titanic oxid.

26. As a new article a composite pigment of specific gravity 2.95 to 3.10 in the form of a soft, fine powder, in color white faintly tinged with cream, and consisting principally of particles of calcium sulfate having thereto adherent smaller particles of titanic oxid.

27. As a new article a composite pigment of specific gravity 2.95 to 3.10 in the form of a soft, fine powder, in color white faintly tinged with cream, consisting principally of particles of calcium sulfate, having thereto adherent smaller particles of titanic oxid, and containing also iron oxid.

28. In the production of composite titanic products from a titanic solution, the step which consists in precipitating compounds of titanium upon particles of matter suspended in said solution.

LOUIS E. BARTON.

Witnesses:
TOM C. GRAHAM,
ORLOW W. BOIES.